United States Patent [19]

Berthiller

[11] Patent Number: 4,616,572
[45] Date of Patent: Oct. 14, 1986

[54] BIOMASS INCINERATOR

[76] Inventor: Franz Berthiller, A-3474 Winkl 2, Niederösterreich, Austria

[21] Appl. No.: 661,582

[22] Filed: Oct. 17, 1984

[30] Foreign Application Priority Data

Oct. 17, 1983 [AT] Austria .................................. 3699/83

[51] Int. Cl.[4] .............................................. F23G 5/04
[52] U.S. Cl. .................................... 110/254; 110/196; 110/204; 110/210; 110/215; 110/216; 110/224; 110/234; 110/267; 110/303; 110/304
[58] Field of Search ............... 110/196, 204, 210, 211, 110/214–216, 219, 224, 234, 244, 247, 248, 251, 254, 259, 263, 283, 288, 303, 304, 306, 345, 346

[56] References Cited

U.S. PATENT DOCUMENTS

| 3,892,662 | 7/1975 | Stout | 110/219 X |
| 4,098,200 | 7/1978 | Dauvergne | 110/204 |
| 4,186,669 | 2/1980 | Cowan et al. | 110/306 X |
| 4,213,407 | 7/1980 | Headley | 110/346 |
| 4,245,569 | 1/1981 | Fallon, III | 110/345 X |
| 4,245,570 | 1/1981 | Williams | 110/346 X |
| 4,311,103 | 1/1982 | Hirose | 110/346 X |
| 4,314,513 | 2/1982 | Berthiller | 110/224 |
| 4,377,116 | 3/1983 | Satake | 110/210 X |

FOREIGN PATENT DOCUMENTS

| 2803158 | 7/1978 | Fed. Rep. of Germany . |
| 2754725 | 3/1979 | Fed. Rep. of Germany . |
| 80/0206 | 10/1980 | PCT Int'l Appl. . |

Primary Examiner—Albert J. Makay
Assistant Examiner—Steven E. Warner
Attorney, Agent, or Firm—Karl F. Ross; Herbert Dubno

[57] ABSTRACT

A compact incinerator for biomass has an upright combustion chamber coaxially surrounded by a passage through which the biomass is fed from a separator in which the primary air is separated from the biomass, to the combustion chamber. An afterburner chamber surrounds this shaft so that flue gases from the combustion chamber can pass through the shaft and be filtered by the biomass while heating the biomass before afterburning is effected in the afterburner chamber. The primary air from the separator is preheated in a preheater in indirect heating exchange by the flue gas in the same coaxial apparatus which also includes, coaxially with the combustion chamber, a flue gas/solids separator for removing solids from the flue gas before it enters the preheater.

23 Claims, 7 Drawing Figures

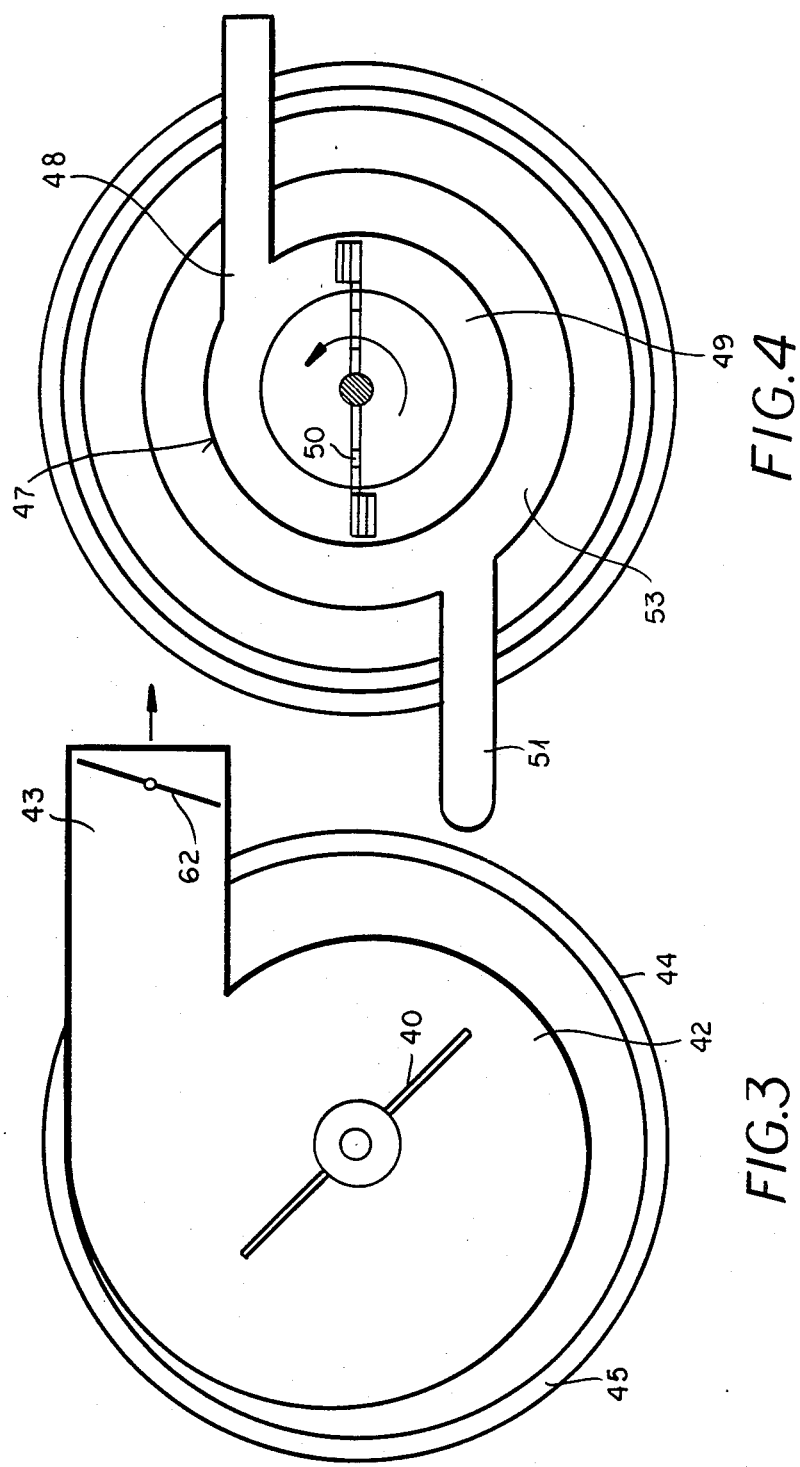

BIOMASS INCINERATOR

FIELD OF THE INVENTION

My present invention relates to a biomass incinerator, more particularly, to an apparatus for the thermal decomposition by combustion of biomass such as straw and wine-pressing residues, i.e. agricultural waste products having a sufficient calorific content to enable them to be burnt utilizing atmospheric air as the combustion-sustaining medium.

BACKGROUND OF THE INVENTION

In the incineration of straw and other agricultural waste products, the principal problem is that the flue gases which are produced contain substances which cannot be released into the environment without detriment.

In the combustion of straw, for example, the latter is frequently available only in a bailed form and in this form cannot be readily burnt.

It can be said, therefore, that many earlier devices or systems for the combustion of agricultural wastes such as straw have proved to be ineffective for one or more of a number of reasons, including the release of high concentrations of toxic or noxious combustion products into the atmosphere, the inability to operate the system continuously, and the insufficiency of the combustion.

OBJECTS OF THE INVENTION

It is the principal object of the present invention to provide an apparatus for the combustion of biomass and especially such biomass as straw and wine-pressing residues, whereby the disadvantages enumerated above can be reduced or eliminated.

Another object of the invention is to provide a biomass incinerator in which the combustion is carried out more efficiently, the discharge of toxic or noxious components is substantially reduced and, in general, the incineration of straw and wine-pressing residues, which have been considered problematical wastes as far as incineration is concerned, can be greatly improved.

SUMMARY OF THE INVENTION

These objects and others which will become apparent hereinafter are attained, in accordance with the invention, in a combustion process and incinerator in which the biomass is fed through a shaft to a combustion chamber which is fed with primary air preheated in an air preheater. The flue gases from the combustion chamber are passed through the infed biomass so as to be filtered thereby and preheat this biomass, the flue gas is then subjected to afterburning in an afterburner chamber, and the air with which the flue gas is afterburned is supplied to the latter chamber from an air/solid separator above the shaft and in which the primary combustion air prior to preheating and for afterburning is separated as the carrier gas, from the solids in the form of biomass which is supplied to the shaft.

With the apparatus of the present invention, the flue gas from the combustion chamber can be in direct contact with the biomass before it enters the combustion chamber so that two effects are realized. First the biomass is preheated and dried, thereby increasing the carbon content per unit weight or mass of the biomass. The second effect is the filtering by the biomass of unburnt components which may have been entrained by the waste gas.

The waste gas or flue gas, therefore, is practically free from particulates before it enters the afterburner and the combustion in the latter is practically exclusively a gas combustion. The combustion air for the afterburner is in part derived from the carrier gas which has been utilized to entrain the biomass pneumatically to the aforementioned separator.

When the air preheater is provided, the flue gas from the afterburner is used to provide the heat which is recovered in the preheater, the latter being preferably a heat exchanger in which the primary air fed directly to the combustion chamber is subjected to heating.

According to a feature of the invention, the flue gas from the afterburner is passed through a solid/gas separator or sieve device before it is used for preheating in the air preheater.

According to yet another feature of the invention, solids which are separated from the flue gas before it enters the air preheater and is discharged through a stack or chimney into the atmosphere and having a certain heat content, are brought into direct contact with the primary air to be preheated to contribute their heat to the air to be preheated. These solids can then be reentrained into the combustion chamber, e.g. by this primary air.

According to yet another feature of the invention, the air from the preheater, advantageously via a blower or compressor, is fed through a three-way valve or some other distributing valve or flap arrangement selectively into the combustion chamber or into the afterburner or solid/gas separator to act as a pneumatic transport for the latter preheater for combustion or simply recovery of heat therefrom.

It has been found to be especially advantageous, and thus it is a feature of the invention, to utilize the ash product which is obtained from the combustion chamber as a source of heat for preheating the air fed to the combustion chamber. In the incineration of agricultural wastes such as straw and wine-pressing residues, in spite of the preheating effect already described by passing the flue gas through the shaft transversely to the free movement of the biomass therethrough to the combustion chamber, this ash product can appear as a liquid, sludge or slurry and can be conducted in droplets from the combustion chamber. The liquid appears to be made up of liquid components distinctively distilled from the material and viscous materials and true ash which may be entrained in the liquid. For convenience, this ash product has also been referred to below as a slag. To recover the sensible heat of the slag for the preheating of the primary air, this primary air is passed into direct contact with the slag by conducting the primary air through the slag flow or the slag flow through the primary air and preferably only a limited portion thereof.

According to yet another feature of this invention, the air heated in the preheater and preferably a portion of this air can be directed by a control element, e.g. a multipath or distributing valve, a flap or the like selectively to the combustion chamber or to the flue gas from the afterburner chamber before this enters the flue gas/solids separator. This has been found to be especially advantageous for providing simple control of the combustion furnace by enabling the heated air to be fed selectively to the combustion chamber or to the flue gas or to both in appropriate proportions.

I have found it to be advantageous, moreover, to provide the afterburner chamber with a shower device, spray head or trickle baffle arrangement for introducing water into the afterburner chamber, thereby promoting the generation of steam and cooling the afterburner chamber.

When a portion of the air from the biomass or separator is passed through the heat exchanger which forms the preheater so that this portion of the primary air is preheated, another portion of this air can be introduced into the afterburner chamber.

An especially compact construction of the incinerator can be obtained when, in accordance with the invention, the combustion chamber and the afterburner chamber are concentric or coaxial with one another and are provided in a common upright boiler.

Advantageously, the feed shaft for the biomass coaxially surrounds the combustion chamber and is, in turn, coaxially surrounded by the afterburner chamber, the common walls of the combustion chamber and the free shaft, on the one hand, and the afterburner chamber and the free shaft on the other hand, being permeable and having a grate-like construction defined by mutually parallel bars preferably extending vertically and parallel to the axis. In this case, the flue gas generated in the combustion chamber can pass directly laterally through the biomass which is distributed around the combustion chamber and is moved downwardly outwardly of this combustion chamber to the filter and preheating effects described previously. The flue gas can then traverse substantially directly the afterburner chamber to which some of the primary air is fed so as to burn the combustibles of this flue gas in the afterburner chamber.

Obviously, the reverse construction can be provided, i.e. the afterburner chamber can be surrounded by the shaft and the combustion chamber in turn in which case the flue gas will flow inwardly.

The wall between the combustion chamber and the free shaft is preferably formed by bars of a refractory material lying closely adjacent each other practically in contact with one another and must advantageously be comprised of an oxide ceramic. A double wall structure can be provided between the free shaft and the afterburner chamber with the rods or bars of these concentric walls in imbrecated relationship, i.e. with each bar and one wall being disposed radially in alignment with the gap between the two bars of the other wall.

An especially simple arrangement for feeding the biomass into the combustion chamber is the lower end of the latter and the lower end of the free shaft, according to the invention, utilizes a star-shaped array of cylinders with respective reciprocating plungers which receive the biomass from the shaft above the cylinders and from which the plungers force the biomass into the bottom end of the combustion chamber.

In one embodiment of the invention, below this star-shaped array of cylinders, a nozzle assembly is provided for blowing the preheated primary air into the bottom of the combustion chamber. In another embodiment, the biomass is moved upwardly through the combustion chamber or into the latter by a worm conveyor rotatable about the axis of the boiler and the combustion chamber.

In this embodiment, the preheated primary air may be introduced by an upwardly extending lance which can rotate with the worm conveyor and which is formed at its upper end with orifices for dispensing the primary air into the combustion chamber. The afterburner chamber can, according to another feature of the invention, be provided in the boiler with the flue gas/solids separator previously mentioned and which may also be coaxially arranged, preferably having a pair of flues separated by a common wall coaxial with the combustion chamber. The separator for the burning and the cooling air can be provided at the upper end of the feed shaft and can include a rotary distributor and the burners for introducing draft and displacing the primary air can be mounted on the boiler structure as well. When a rotary lance is provided, it advantageously has radial arms from which the primary air is distributed and which, by their rotation in the biomass ensure an especially intimate contact of the biomass with the combustion air and also ensure that the biomass will be cast outwardly along the bars defining the combustion chamber so that it may adhere somewhat to these bars and have sufficient residence time within the combustion chamber for the desired degree of combustion.

The liquid ash product is guided downwardly between the cylinders of the star-shaped area and can be collected in a trough below the combustion chamber.

With deflection of the gas between the flues and a sieve structure in a coaxial arrangement with the flues, according to the invention, an especially compact arrangement is ensured. According to another feature of the invention, above this sieve basket a suction blower is provided and has rotor blades running in a space disposed within this separator, this space communicating with a chimney or stack through which the waste gas is discharged. This arrangement ensures a most effective separation of the gas component from the solid particles since the blower displaces the gas phase through the sieve and can be used to displace it in a forced draft system to the stack.

For maximum utilization of the heat generated in the incinerator, it is advantageous in accordance with the invention to cover the separator at its top and laterally by a bell. In this case, the space between the bell and the separator is supplied with fresh air, most advantageously via an opening in the bell disposed coaxially with the combustion chamber. The interior of the bell is connected to an inlet of the primary air blower, preferably via a control flap or valve. In addition, this ensures an effective isolation of the boiler in which the insulating medium is the ash which can be utilized for combustion. The outer walls of the device thus also can be traversed by air, e.g. the primary air, which is to participate in combustion and which is thereby sufficiently heated. The water pipes for the water heated in the boiler can be formed along any of the walls or within the grate bars previously mentioned.

An effective feed of the biomass can be ensured when the biomass is pneumatically supplied to a separator located above the shaft and which is formed as a filter basket. The outlet for the biomass is formed as a circular ring which communicates with the shaft and within this filter basket a distributor member, preferably having two radial arms, is provided as a mixer. The distributor is driven by an electric motor and drive which can be located above the boiler. The interior of this filter basket, especially the lower portion thereof, must be filled to these distributing arms. This also ensures that the exhaust gas from the combustion chamber will pass through the biomass laterally and not mix with the air separated from the biomass. In this case the biomass in the filter basket acts as a seal against upward escape of the flue gas. The resistance to rotation of the distributor is a measure of the degree of filling of the basket and I control the feed of the biomass to the basket in response to the measurement of the resistance on this distributor.

It has been found to be particularly advantageous when the distributor arms at least in the region of the free ends are curved and have a width which is somewhat less than the width of the circular ring for feeding the biomass into the shaft.

It has also been found to be advantageous when air utilized to convey the biomass passes through a portion of the wall of this filter basket and the air thus separated from the biomass is conducted by a duct, preferably by a flow control element such as a flap, to the air preheater while the remainder of the ash traversing the wall of the filter basket laterally is supplied directly to the afterburner chamber which opens upwardly into an annular space surrounding the filter basket.

BRIEF DESCRIPTION OF THE DRAWING

The above and other objects, features, and advantages of the present invention will become more readily apparent from the following description, reference being made to the accompanying drawing in which:

FIG. 3 is a section taken along the line A-B of FIG. 2;

FIG. 4 is a section taken along the line C-D in FIG. 2;

SPECIFIC DESCRIPTION

The apparatus of the present invention is intended for the incineration of biomass and especially straw and agricultural waste products such as wine-pressing residues and like agricultural materials from which extracts and other valuable substances, e.g. oils, have been removed, which are cellulosic or otherwise incineratable, most advantageously with a contribution to the energy utilized in the system by an exothermic action, and which does not have any other great utility either as a fertilizer or as animal feed or in some other industrial or agricultural way.

Figure 1:
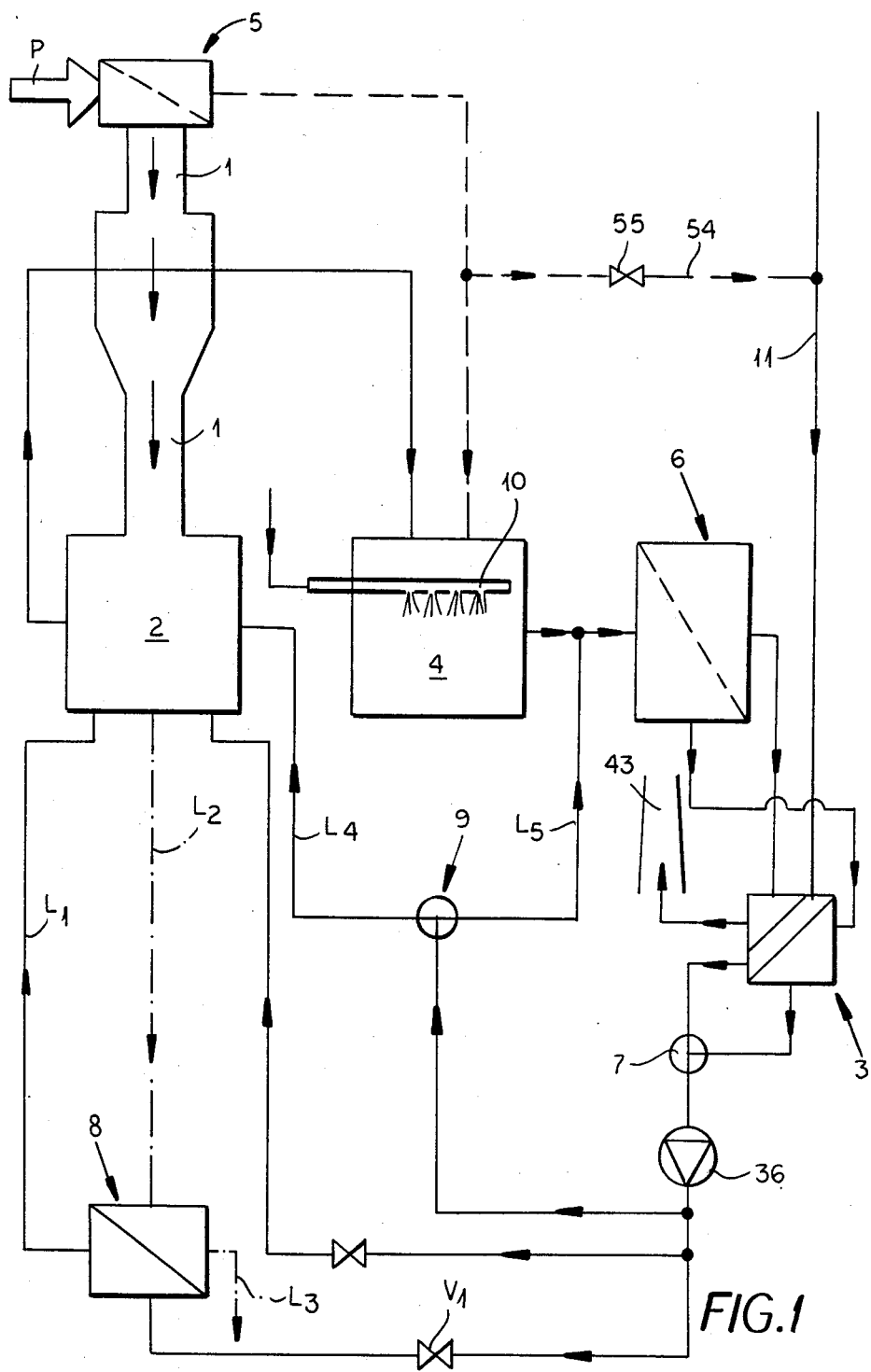
FIG. 1 is a flow diagram, partially in block form, illustrating an apparatus for the incineration of biomass.

FIG. 1 represents a block diagram of such an apparatus to which the biomass is fed with air in the direction of arrow P by any conventional pneumatic conveyor. By a pneumatic conveyor, I mean a device, e.g. a pipe, which is supplied with an air stream, forming a carrier gas, and to which the comminuted material to be incinerated, i.e. the biomass, is added so that the particles of the biomass are actually entrained in flight by the air stream.

The pneumatically conveyed biomass at P is separated in a sieve 5, forming an air/solids separator, into the solid matter which fills by gravity through a shaft 1 into a combustion chamber 2 and the carrier air which passes as represented by broken lines to chamber 4.

The combustion chamber is supplied with primary air preheated in a preheater by an indirect heat exchange. To this end, the primary air passes via a line 54 to a line 11 then into the heat exchanger 3 from which it is delivered by a blower or compressor 36 to the combustion chamber 2.

Flue gases from the combustion chamber 2 are first passed through the shaft 1 where they meet the oncoming biomass and heat this biomass to reduce the moisture content thereof and increase the proportion of carbon per unit mass (weight or volume) of the biomass.

The flue gases from the combustion chamber 2 result from a decomposition of the biomass in shaft 1 in particular or simply a moisture removal therefrom and from the combustion process. However, by passing the flue gases through the biomass in shaft 1, I am able to effect a precleaning of the flue gas since the biomass acts similarly to a filter and traps at least to some of the particulates, the absorbable toxic or noxious components, resulting from the combustion.

This precleaned flue gas is supplied to an afterburner chamber 4 to which a certain amount of the carrier air from the sieve chamber 5 is supplied. A further combustion is kept out of combustibles in the flue gas in the afterburner 4 and the flue gases from the latter can be fed further to a sieve chamber, sifter or gas/solids separator 6. The gas phase is passed through the preheater heat exchanger 3 and then vented to a chimney or stack 43 while the solid phase is delivered to the other chamber of the heat exchanger 3 where it is entrained with the primary air as it is preheated so that its sensible heat contributes to the heating of the air which is fed at least in part as the primary air. The mass is ignited initially by a fuel gas jet or the like.

The ash is removed from the combustion chamber 2 in a flowable state. To recover the heat which is contained in this stage, a heat exchanger 8 can be provided which is traversed under the control of a valve $V_1$ of a portion of the preheated primary air from the compressor blower 36 so that this further heated portion of the preheated air via the line $L_1$ is also delivered to the combustion chamber from the heat exchanger 8. The path of the flowable or liquid ash or residue has been represented by the line 2 and this residue can be discharged as shown at $L_3$ or recycled to a combustion stage.

A portion of the air from the preheater 3 can be directed via a multipath or distributing valve 9, e.g. a flap valve or the like either to the combustion chamber via line $L_4$ or, for admixing with the flue gas via line 5 before the flue gas enters the separator 6.

It is also possible, utilizing the distributor valve 9 or a flap, to supply the combustion chamber 2 with a portion of the flue gas from the afterburner chamber 4.

Water can be sprayed into the afterburner chamber 2 as represented, for example, by the showering nozzles 10.

For the portion of the air which is to serve as primary air, a path 54 provided with a control element such as a valve 5 is provided.

Figure 2:
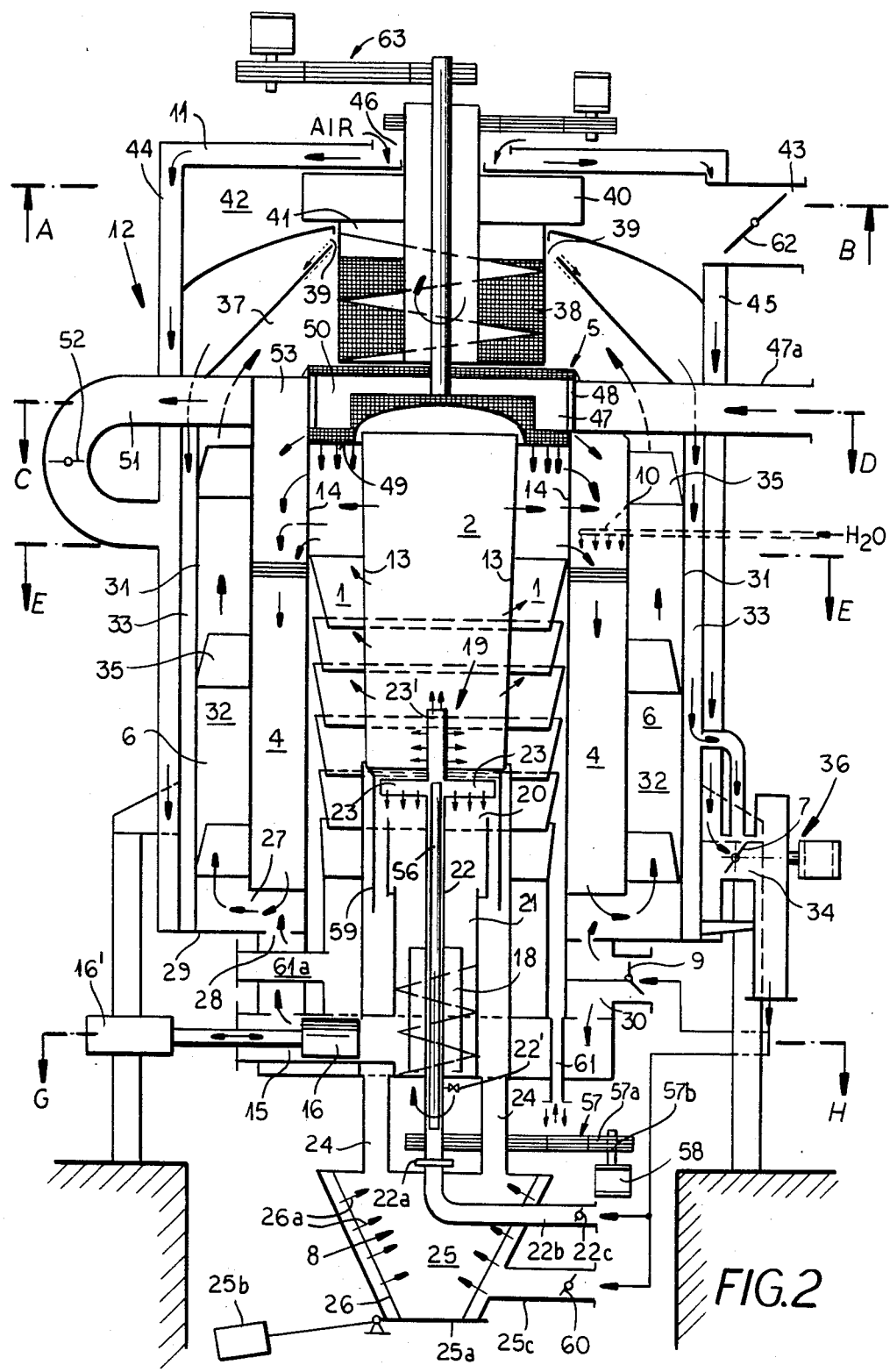
FIG. 2 is a vertically longitudinal cross section through a boiler for the incineration of biomass illustrated in highly diagrammatic form.
Figure 6:
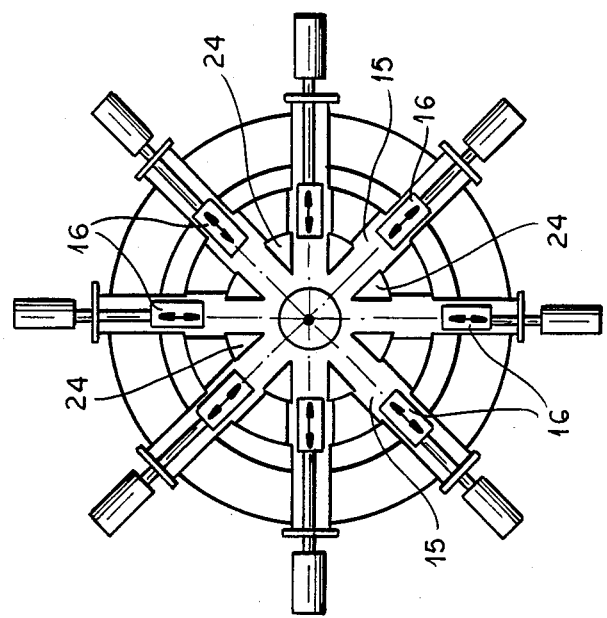
FIG. 6 is a section taken along the line G-H of FIG. 2.
Figure 7:
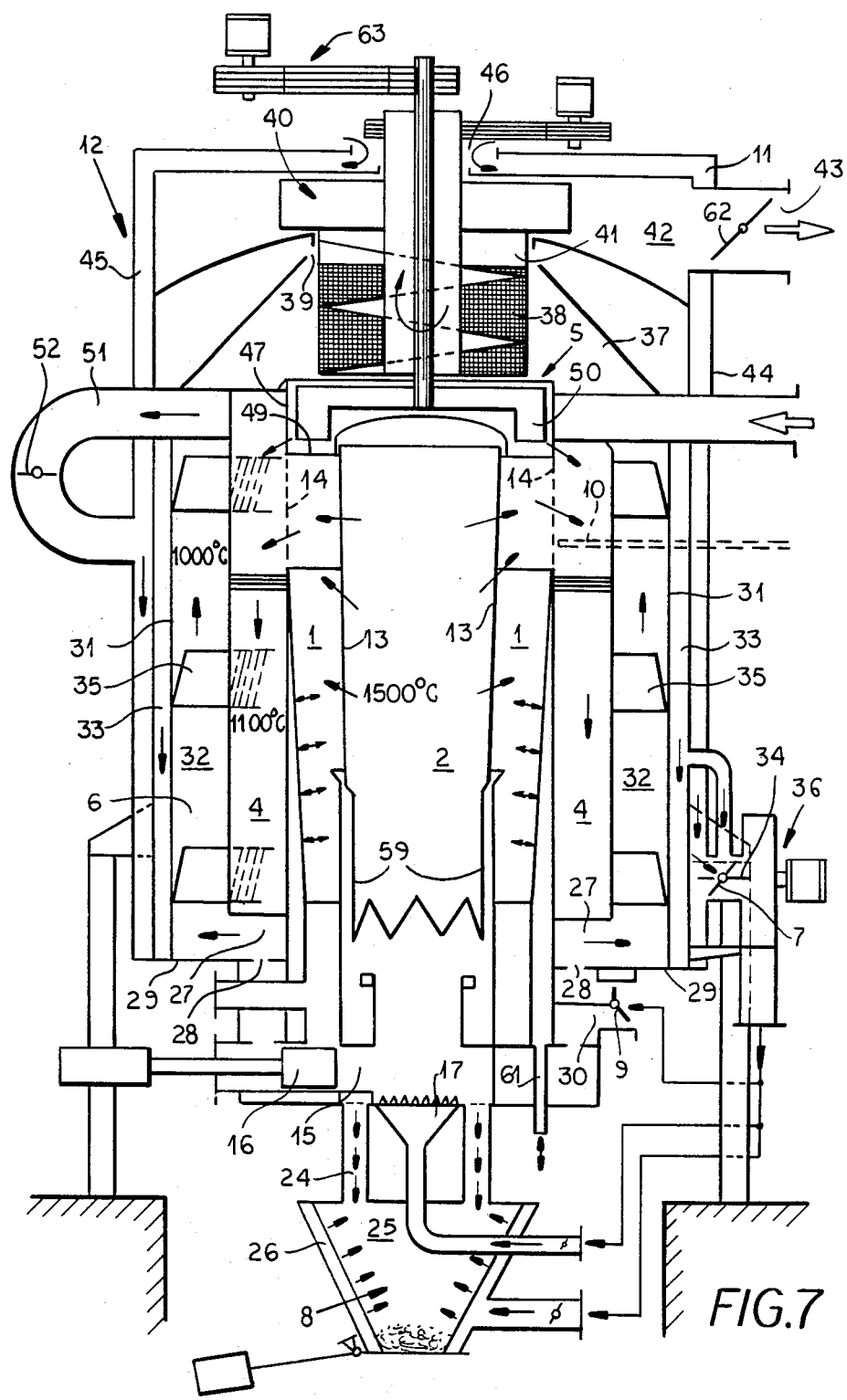
FIG. 7 is a longitudinal section taken in a vertical plane through a second embodiment of the boiler differing from that of FIG. 1.

While FIG. 1 shows the various flows in diagrammatic form, it will be understood that the structural relationship illustrated in FIGS. 2 or 7 are preferred, hence the combustion chamber 2 and the afterburner chamber 4 are coaxially disposed in a common boiler represented at 12. The boiler is preferably of the upright type and the feed shaft 1 for the biomass can coaxially surround the combustion chamber 2 as is also apparent from FIGS. 2 and 7.

In this case, the feed shaft 1 for the biomass is here formed as an annular compartment which is located between the combustion chamber 2 and the afterburner chamber 4. The wall between the combustion chamber 2 and the feed shaft 1 for the biomass is preferably constituted as a grate of bars 13 (FIG. 5) of refractory material. The bars 13 preferably lie in sufficiently close relationship, preferably light partial contact, so that gas can pass between the bars but the biomass cannot and there is no possibility of completely sealing off gas flow by the bars or the biomass.

This arrangement of the grate allows the hot gases from the combustion chamber to pass directly through the biomass in the shaft 1 to dry the biomass and preheat it to the point that its carbon content per unit mass is increased.

Simultaneously the biomass in the shaft 1 moves downwardly and effects a filtration of the flue gases from the combustion chamber which pass into the afterburner chamber 4.

The afterburner chamber 4 is also formed as a basket from bars or rods 14 which as in the case of the bars 13, extend along generatrices of the respective walls and parallel to the axis of the apparatus.

The wall between the feed shaft 1 and the afterburner chamber 4 is formed from two coaxial layers of circumferentially spaced mutually parallel bars 14 with the bars of the two layers being in imbricated relationship.

Figure 5:
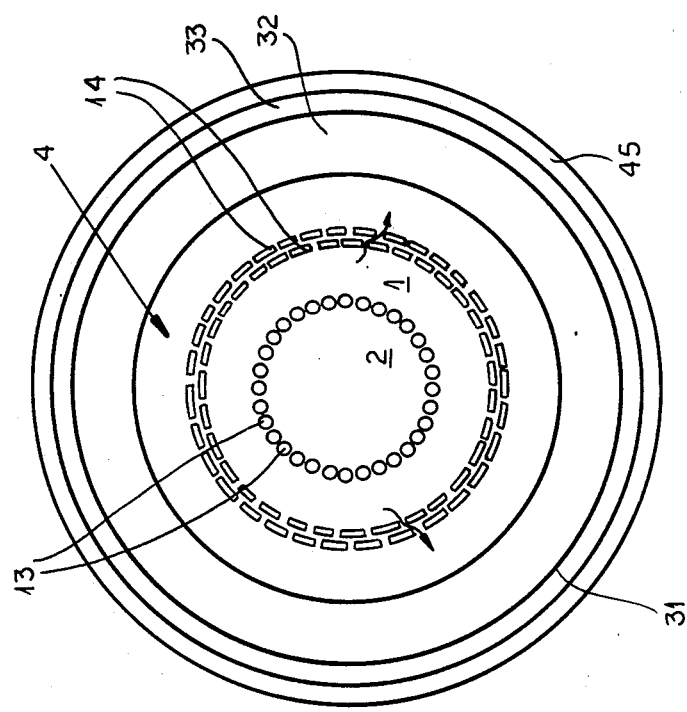
FIG. 5 is a section taken along the line E-F of FIG. 2.

The feed shaft 1 for the biomass opens in the region of its lower end in the sidewall of a space which, as can be seen from FIG. 5 has cylinders 15 disposed in a star shape around the longitudinal axis of the combustion chamber. 2.

In the cylinder chambers 15, respective feed pistons 16 are reciprocatable by respective fluid operated cylinder arrangements represented, for example, at 161'. A burner nozzle assembly 17 is provided in the combustion chamber 2 below the discharge ends of the cylinder chambers 15. This nozzle assembly 15 is supplied with primary air from the air preheater 3. The primary air is fed to this nozzle assembly by a blower 36 at a controllable rate.

In the embodiment of FIG. 2, by contrast with that of FIG. 1, the lower end of the combustion chamber 2 is provided with a feed worm 18 which is rotatable about the vertical axis of the apparatus and extends through the region at which the mouths of the cylinders 15 open. In this embodiment, to feed the primary air into the combustion chamber, a lance 19 opens into the combustion chamber 2, is coaxial with the worm conveyors 15 and rotates with the latter. Above the mouths of the cylinder chambers 15, the worm conveyor 18 is surrounded by a feed shaft 21 which opens upwardly at 20. The lance has outlet openings for blowing the primary air into the combustion chamber located above the mouth 20 of the shaft 21. Because of the rotation of the lance 19 and its outlets an especially effective distribution and feed of the air to the combustion chamber 2 is ensured thereby ensuring an intimate mixing of the air with the biomass fed into the combuston chamber and with the biomass which is undergoing combustion in this combustion chamber.

More specifically, the lance 19 has a stem 22 from which at least one pair of side arms 23 radiate and are formed with downwardly open orifices or nozzles for the air, possibly upwardly open nozzles and with radially opening nozzles on a standpipe $23^1$ rising axially from these arms and also provided with orifices at its upper end.

The lance 19 is so constructed that its arms 23 already in the region of the lower end of the wall of the combustion chamber 2 formed as a grate, i.e. constituted by the bars 13.

Within the stem 22 which can carry the worm 18, a rod 56 is vertically shiftable and can be fixed in position. An end of this bar is disposed in the region of the breaking of the arms 23 and the stem $23^1$ from the stem 22, thus depending upon the height of the end face of the rod 56 more or less primary air can be distributed by the orifices into the combustion chamber 2 via the lance 22 a screw $22^1$ on the stem 22 and engage the rod 56 to hold it in position once its height has been set.

The lance 19 and the worm conveyor 18 are drawn by a belt drive 57. To this end, the stem 22 can be generated at 22a upon a nonrotatable primary air feed pipe 22 by having a flap valve 22c and can be formed with a pulley engaged by the belts 57a which pass over a pulley 57b of an electric motor 58.

For discharging the ash which is removed as a liquid residue from the combustion chamber 2, passages 24 are provided which open into an ash trough 25 in the form of a double-wall frustoconically closed at its lower end by a flap 25a controlled by a counterweight 25b.

The double wall of this trough 25 is supplied with air from the preheater 3 via a flap valve 60 and a pipe 25c. The inner wall 26 of the double wall is formed with orifices as represented by the arrows 26a through which the heated air is introduced for further heating of the primary air by the ash residue from the combustion chamber. An opening or guide plate 29 spaced from the shaft 21 and disposed outwardly thereof, conducts the residue downwardly past the rising biomass.

A duct 61 carries a small portion of flue gas after it has been filtered by the biomass away. This gas can be used to drive a gas turbine or other gas motor. A further duct 61a can also be used for this purpose and either can be employed to supply additional air, e.g. via a blower to the combustion chamber for incineration of the biomass.

The solid/gas separator 6 for the flue gas from the afterburner chamber 4 is as can be seen from FIGS. 2 and 7. The separator 6 coaxially surrounds the afterburner chamber in the boiler 12. At its bottom, this separator is connected via a passage 27 with the afterburner chamber 4. The passage 27 communicates via openings 28 in the boiler bottom with an annular chamber 30 supplied with air from the preheater 3. This air, as previously mentioned, is displaced by a blower 36 seen to be mounted on the right-hand side of the boiler in FIGS. 2 and 7. To control the air feed to the annular chamber 30, the distributing valve 9 is provided, this valve being visible in FIGS. 2 and 7 as well as a flap valve.

The solids/gas separator for the flue gas from the afterburner chamber 4 is provided with two flues 32, 33 extending along the common wall 31 and defined at least in part thereby. The flue 32 is connected via the passage 27 with the afterburner chamber 4. The second flue 33 is connected to an inlet 34 at the suction side of the blower 36 for displacing the primary air. Within the flue 32, I provide guide surfaces or baffles for generating turbulence or vortices in the flue gas. These baffles being inclined to the longitudinal dimension of the flue 32.

The flue 32, which is connected via the passage 27 with the afterburner chamber 4, opens into a spacing 37 which is located above the combustion chamber 2 and the feed shaft 1 for the biomass and above the afterburner chamber 4 in the boiler 12.

A sieve basket 28 is disposed in the space 37 coaxially with the combustion chamber. The wall 31 between the flues 32 and 33 is open in the direction of the surface of the sieve basket and converges in the direction thereof but ends at a clearance from the sieve basket forming a passage 39 between the flues 32 and 33.

Above the sieve basket 38 a suction blower 40, designed to induce a draft for the system, is provided.

The inlet 41 of the blower 40 communicates with the interior of the sieve basket 38. The blades of the motor of the blower 40 rotate within a compartment 42 of the gas/solids separator communicating with the flue gas outlet 43. The flow cross section for the flue gases in the flue gas outlet 43 is regulated by a flap 62.

The solids/gas separator 6 is closed at its rough end laterally by a bell 44 so that between the separator and the bell, a space 45 remains through which fresh air can be admitted via an opening 46 coaxially with the combustion chamber. This enables the fresh air to be added to the gases as may be desired.

The interior 45 of the bell is connected to the inlet 34 of the blower 36 which sucks the primary air through the opening 46 of the bell into the space 45.

The gas/solids separator 5 comprises a filter basket 47. The biomass is entrained by the pneumatic conveying air, subsequently to form the primary air, into the filter basket 47 via a passage 48 in the wall of the filter basket and a duct 47a The outlet 49 for the biomass is formed as a ring. This ring communicates with the shaft 1 allowing the biomass to pass into the latter. A rotor 63 forms a distributor 50 within the basket facilitating separation of the air phase from the solid phase. The distributor 50 (FIG. 4) is covered at least at its free ends and there has a width which is somewhat less than the width of the circular ring 49 feeding the biomass into the shaft 1.

A portion of the air from which the biomass has been separated in the basket 49 is fed via a duct 51 which can be provided with a control element such as the flap 52 to the air preheater 3. In the illustrated embodiment, the duct 51 opens in the outer surface of the bell 44. The remainder of the air passing laterally through the wall of the filter body or basket 47 is fed to the afterburner chamber 41 which opens upwardly into the annular chamber 53 surrounding this basket.

This apparatus, as has been described in connection with FIG. 1, although extremely compact and efficiently constructed, operates precisely in the manner described in connection with this phase.

It should be noted that the heat exchanger 3 can be separately traversed by the solids recovered from the flue gas which can be added to the primary air via the three way or distributing valve 7. In this mode, the valve 7 can be set to recycle the solids to the separator 6 via the line L5.

I claim:

1. An incinerator for a biomass such as straw or winepressing residue, comprising:
    a vertical biomass feed shaft;
    an air/solids separator for separating pneumatically conveyed biomass from primary combustion air, communicating with one end of said shaft for delivering biomass freed from conveying air thereto;
    means forming a combustion chamber communicating with the opposite end of said shaft for receiving biomass therefrom and burning said biomass in said combustion chamber with at least a portion of said primary air to form a flue gas;
    means connected to said combustion chamber and forming a direct lateral opening from the combustion chamber into said shaft for passing said flue gas transversely through said shaft into contact with biomass therein, thereby preheating said biomass in said shaft and filtering said flue gas by a filter action of said biomass; and
    means forming an afterburner chamber receiving said flue gas after it has traversed said shaft for afterburning combustible components in said flue gas, with air at least in part received from said separator.

2. The incinerator defined in claim 1, further comprising a preheater for said portion of said primary air connected between said separator and said combustion chamber.

3. An incinerator for a biomass such as straw or winepressing residue, comprising:
    a vertical biomass feed shaft;
    an air/solids separator for separating pneumatically conveyed biomass from primary combustion air, communicating with one end of said shaft for delivering biomass freed from conveying air thereto;
    means forming a combustion chamber communicating with the opposite end of said shaft for receiving biomass therefrom and burning said biomass in said combustion chamber with at least a portion of said primary air to form a flue gas;
    means connected to said combustion chamber for passing said flue gas transversely through said shaft into contact with biomass therein, thereby preheating said biomass in said shaft and filtering said flue gas by a filter action of said biomass;
    means forming an afterburner chamber receiving said flue gas after it has traversed said shaft for afterburning combustible components in said flue gas, with air at least in part received from said separator;
    a preheater for said portion of said primary air connected between said separator and said combustion chamber; and
    a flue gas/solids separator receiving flue gases from said afterburner chamber and feeding same to said preheater for heating said portion of said primary air therein.

4. The incinerator defined in claim 3, further comprising means for feeding particles collected from the flue gas separated from said flue gas in said flue gas/solids separator to said portion of said primary air for recovering sensible heat from said particles.

5. The incinerator defined in claim 3, further comprising means for recovering an ash product from said combustion chamber and for further preheating said portion of said primary air therewith.

6. The incinerator defined in claim 3, further comprising a distributing valve for selectively feeding air from said preheater to said flue gas/solids separator and to said combustion chamber.

7. The incinerator defined in claim 3 wherein said afterburner chamber is provided with means for showering water into said afterburner chamber.

8. The incinerator defined in claim 3, further comprising control means for selectively feeding air from the separator in which biomass is separated from air into said afterburner chamber and said preheater.

9. The incinerator defined in claim 3 wherein said flue gas/solids separator is formed coaxially with said afterburner chamber in a common boiler.

10. The incinerator defined in claim 3 wherein said combustion chamber and said afterburner chamber are provided coaxially with one another in an upright boiler, and said shaft coaxially surrounds said combustion chamber with said shaft being disposed between said combustion chamber and said afterburner chamber.

11. The incinerator defined in claim 10 wherein a wall between said combustion chamber and said shaft is common to them and is formed as a grate of substantially mutually adjacent bars of a refractory material.

12. The incinerator defined in claim 11 wherein said material is an oxide ceramic.

13. The incinerator defined in claim 11 wherein a common wall between said shaft and said afterburner chamber at least at an upper portion thereof is constructed as a basket formed from rods.

14. The incinerator defined in claim 13 wherein said common wall between said shaft and said afterburner chamber has a double wall construction with the rods thereof disposed on an imbricated pattern.

15. The incinerator defined in claim 11 wherein said shaft communicates at its lower end with a star-shaped array of cylinders in which respective plungers are reciprocatable to displace said biomass into said combustion chamber.

16. The incinerator defined in claim 15, further comprising a nozzle assembly opening into said combustion chamber below said cylinders for introducing said portion of said primary air into said combustion chamber.

17. The incinerator defined in claim 15, further comprising a worm conveyor extending from a region of said cylinders upwardly into said combustion chamber, said worm conveyor being provided with an upwardly extending lance rotatable therewith for delivering said portion of said primary air from said preheater into said combustion chamber above said worm conveyor.

18. The incinerator defined in claim 17 wherein said lance is formed with a pair of lateral arms at an upper end thereof formed with orifices through which said primary air is introduced into said combustion chamber.

19. The incinerator defined in claim 15, further comprising means between said cylinders for withdrawing an ash product from said combustion chamber and including an ash trough capable of collecting said product in a liquid form.

20. The incinerator defined in claim 15, further comprising a flue gas/solids separator coaxially surrounding said afterburner chamber for separating solids from flue gas emerging from said afterburner chamber.

21. The incinerator defined claim 20, further comprising a pair of coaxial flues separated by a common wall and connected to said flue gas/solids separator, a first of said flues being provided with baffles for inducing turbulence in a flue gas traversing same, the other of said flues being connected to a blower.

22. The incinerator defined in claim 21 wherein said separator separating the biomass from the conveying air is provided above an upper end of said shaft in said boiler and includes a rotating member for distributing biomass therein.

23. The incinerator defined in claim 22 wherein said one of said flues of said flue gas/solids separator opens into a space above said combustion chamber provided with a sieve basket.

* * * * *